United States Patent
Lacarbonara et al.

(10) Patent No.: US 10,591,014 B2
(45) Date of Patent: Mar. 17, 2020

(54) MULTI-PERFORMANCE HYSTERETIC RHEOLOGICAL DEVICE

(71) Applicant: UNIVERSITA' DEGLI STUDI DI ROMA "LA SAPIENZA", Rome (IT)

(72) Inventors: Walter Lacarbonara, Rome (IT); Biagio Carboni, Rome (IT)

(73) Assignee: UNIVERSITA' DEGLI STUDI DI ROMA "LA SAPIENZA", Rome (IT)

( * ) Notice: Subject to any disclaimer, the term of this patent is extended or adjusted under 35 U.S.C. 154(b) by 55 days.

(21) Appl. No.: 15/548,898

(22) PCT Filed: Feb. 22, 2016

(86) PCT No.: PCT/IT2016/000043
§ 371 (c)(1),
(2) Date: Aug. 4, 2017

(87) PCT Pub. No.: WO2016/132394
PCT Pub. Date: Aug. 25, 2016

(65) Prior Publication Data
US 2018/0245655 A1 Aug. 30, 2018

(30) Foreign Application Priority Data
Feb. 20, 2015 (IT) .............................. RM2015A0075

(51) Int. Cl.
*F16F 7/14* (2006.01)
*F16F 7/116* (2006.01)
(Continued)

(52) U.S. Cl.
CPC .............. *F16F 7/116* (2013.01); *B60R 19/18* (2013.01); *B60R 19/34* (2013.01); *F16F 7/1005* (2013.01);
(Continued)

(58) Field of Classification Search
CPC .. F16F 7/116; F16F 7/1005; F16F 7/14; F16F 15/06; F16F 2222/08; F16F 2224/0258; F16F 2228/066; B60R 19/18; B60R 19/34
See application file for complete search history.

(56) References Cited

U.S. PATENT DOCUMENTS

| | | | | |
|---|---|---|---|---|
| 3,165,945 A | * | 1/1965 | Magrum | F16F 1/362 464/68.91 |
| 7,410,039 B2 | * | 8/2008 | Or | F16F 7/104 188/267 |

(Continued)

FOREIGN PATENT DOCUMENTS

| | | | | |
|---|---|---|---|---|
| CN | 203714159 U | | 7/2014 | |
| DE | 1500649 A1 | * | 7/1969 | ............... F16F 7/14 |

(Continued)

OTHER PUBLICATIONS

Chinese Office Action dated Jun. 21, 2019, in connection with corresponding CN Application No. 201680021923.2 (6 pgs., including English translation).

(Continued)

*Primary Examiner* — Thomas W Irvin
(74) *Attorney, Agent, or Firm* — Maier & Maier, PLLC

(57) ABSTRACT

A multi-performance hysteretic rheological device. The invention concerns a mechanical device capable of providing restoring forces with non-linear hysteresis loops whose shapes can be adjusted depending on the specifications required by the application. The forces exerted on rigid sliding blocks on smooth bars are for example produced by the wire ropes composed of steel and shape-memory material wires. The device according to the invention can be used in very different applications including: vibration damper, hysteretic insulator, energy absorber, shock absorber, appli- (Continued)

cations in which a specific rheological body with force-displacement characteristics of hysteretic type is required.

21 Claims, 12 Drawing Sheets

(51) Int. Cl.
    *F16F 15/06*     (2006.01)
    *B60R 19/18*     (2006.01)
    *B60R 19/34*     (2006.01)
    *F16F 7/10*     (2006.01)

(52) U.S. Cl.
    CPC ............... *F16F 7/14* (2013.01); *F16F 15/06* (2013.01); *F16F 2222/08* (2013.01); *F16F 2224/0258* (2013.01); *F16F 2228/066* (2013.01)

(56) References Cited

U.S. PATENT DOCUMENTS

| | | | | |
|---|---|---|---|---|
| 8,441,615 B2* | 5/2013 | Hashemi | ............... | F16F 15/06 248/562 |
| 10,458,502 B2* | 10/2019 | Sharkh | ............... | F16F 7/1011 |
| 2006/0272912 A1* | 12/2006 | Cai | ............... | F16F 7/14 188/380 |
| 2018/0105135 A1* | 4/2018 | Keats | ............... | E04H 9/02 |
| 2018/0238411 A1* | 8/2018 | Sharkh | ............... | F16F 7/1011 |

FOREIGN PATENT DOCUMENTS

| | | | |
|---|---|---|---|
| DE | 3816033 A1 * | 12/1989 | ............. E04B 1/985 |
| EP | 2221501 A2 | 8/2010 | |
| GB | 2488563 A | 9/2012 | |
| WO | 96/27055 A1 | 9/1996 | |
| WO | 2013/042152 A1 | 3/2013 | |

OTHER PUBLICATIONS

International Search Report and Written Opinion dated Dec. 8, 2016 of corresponding International application No. PCT/IT2016/000043; 20 pgs.

Search Report dated Nov. 11, 2015 of corresponding Italian application No. RM2015A000075; 8 pgs.

Chinese Office Action dated Jan. 14, 2019, in connection with corresponding CN Application No. 201680021923.2 (8 pgs., including English translation).

* cited by examiner

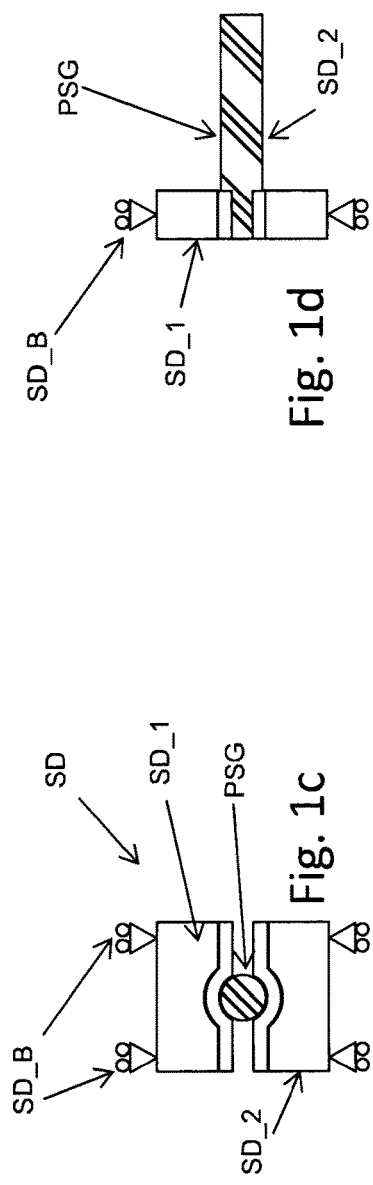
Fig. 1c
Fig. 1d
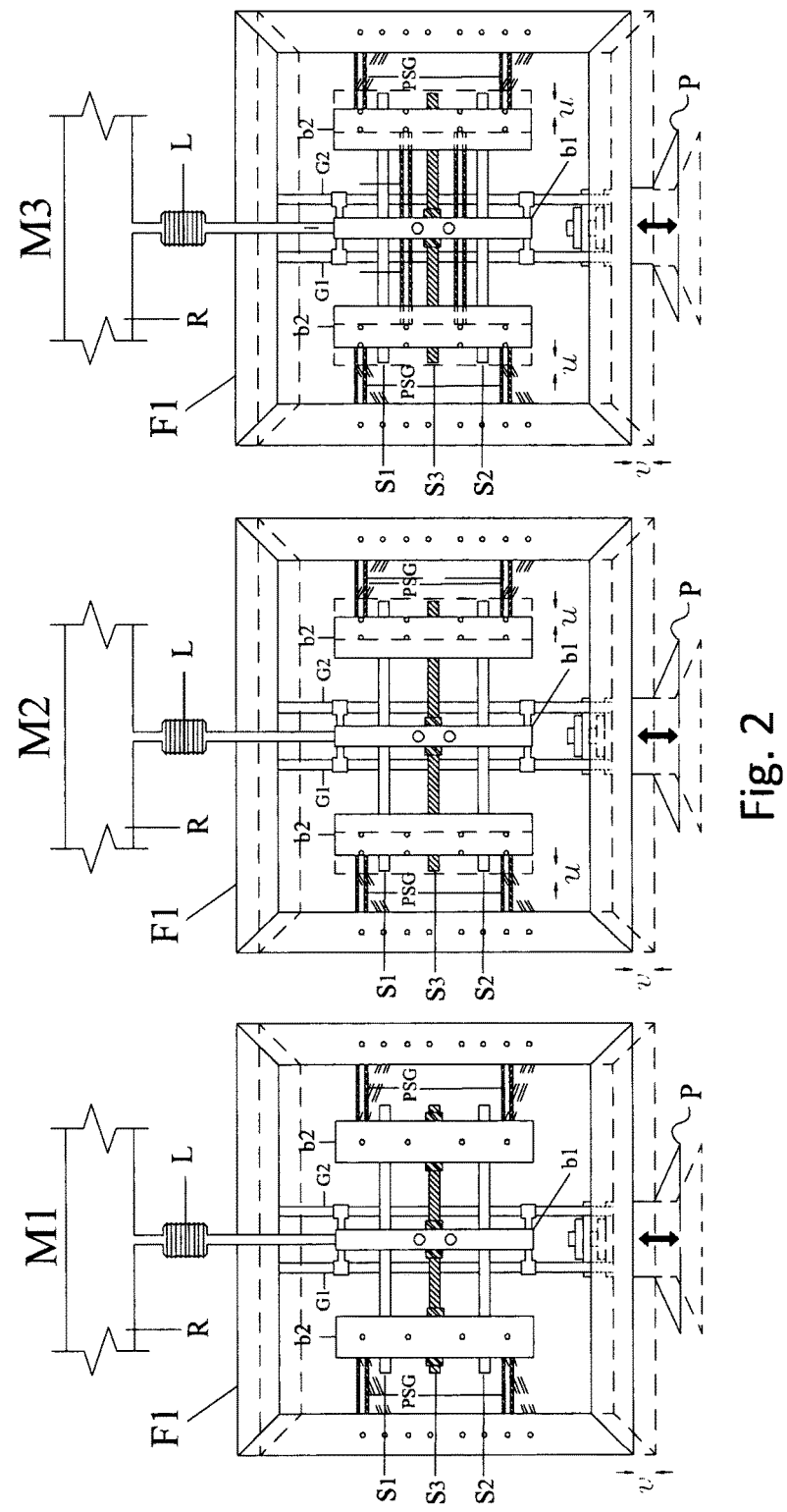
Fig. 2

MULTI-PERFORMANCE HYSTERETIC RHEOLOGICAL DEVICE

FIELD

The present invention relates to a multi-performance hysteretic rheological device.

BACKGROUND

More precisely, the invention concerns a mechanical system capable of providing restoring forces characterized by non-linear hysteresis loops, whose shapes can be adjusted depending on the specifications required by the application. The forces are to be carried for example by wire ropes composed of steel and shape-memory material wires. The system is represented by a closed frame within which groups of wire ropes are housed, connected on one side to two parallel uprights and on the other side to a pair of rigid metal elements subject to equal displacement for the presence of two smooth bars crossing them and on which they can slide substantially without friction. Such smooth bars are fixed in the center line to a further central metallic element with respect to the other, which in turn can slide without friction on two additional smooth bars orthogonal to the previous ones and which act as guide shafts. The latter are fixed to the ends to two parallel sides of the closed frame. The set of the three elements and of the two smooth bars crossing them constitutes the secondary frame whose translation relative to the closed frame in the direction orthogonal to the ropes produces the nonlinear hysteretic restoring forces. When the secondary frame acts as vibrating mass, being capable of sliding on the underlying guides, the device operates as a vibrations damper. When the above system is introduced into a metal rod, the rod becomes a dissipative damping brace thanks to the dissipation exerted by the mechanism. When the device is configured in such a way that the sliding central element supports a structure while the closed frame is fixed to a base subject to undesirable motions (e.g. seismic motion or motion induced by machinery), the body acts as a vibrations hysteretic isolator for the main structure. When the closed frame is fixed on a movable member and the secondary frame impacts on an obstacle, the device exerts its action by absorbing shocks.

STATE OF THE ART

The state of the art relating to hysteretic rheological devices is very articulated, and therefore the description is limited to publications that have a strong relevance to the solution of the invention. The prior art relevant to vibrations dampers is first described, followed by isolators and damped braces, and finally by the shock absorbers.

The first tuned mass damper based on energy dissipated by friction between the wires of steel ropes is the Stockbridge Damper [1] patented in 1928. This device consists of a short wire rope tied in the middle and at whose ends two free oscillating masses are fixed. Its use is to reduce dynamic vibrations induced by the wind on the high voltage cables.

In 1996 a hysteretic insulator [2] was proposed, which is formed by two parallel metal bars connected with a coil constituted by a steel rope. The latter provides a hysteretic-type restoring force to the relative translation between the two bars. The idea is to fix a bar and connect to the other one the structure to be insulated. With this patent, the so-called "wire ropes springs" have been created, represented by steel ropes arranged in the shape of coil, which have been spread along time on a commercial level.

More recently, Vestroni, Lacarbonara and Carpineto [3] have files a patent application on a tuned mass damper consisting of short steel wire ropes subjected to bending cycles with double curvature. The ropes, thanks to the friction damping, confer a hysteretic type restoring force to an oscillating mass. Placing the damper on a main structure, this receives, from the oscillating mass, control forces that attenuate the vibrations of the structure itself. FIG. 3(a) shows a constitutive behavior similar to that obtained with this device. However, this solution has the disadvantage that the wires work in a hardening condition, obtaining a force-displacement diagram characterized, in the loading phase, by a stiffness increasing with increasing oscillation amplitude.

The same disadvantage is to be found in the system according WO9627055A1.

Articles [4] and [5] synthetically describe the interaction of the mechanisms of dissipation by friction and phase transformation of the shape-memory material and the ensuing positive effect in terms of equivalent damping. The non-linear vibrations absorbers in the present state of the art suffer from a loss of tuning, and thus a loss of performance in attenuating the vibrations of a main structure by the effect of the significant variation of damping and resonance frequency as a function of the oscillation amplitude. Furthermore, the device of reference [3] cannot be used, for example, as hysteretic isolator, since it is not possible to fix the structure to be insulated to the oscillating masses, both because these masses cannot provide a support, and because during the oscillations they are subject to rotations with respect to the rest configuration orthogonal to the ropes.

In the literature many hysteretic isolators and dissipative braces have been proposed as well, that exploit the dissipation by phase transformation of shape-memory alloys.

Grasser and Cozzarelli [6] proposed the shape-memory alloys as a new material for the seismic isolation. Wilde, Gordoni and Fujino [7] proposed the idea of combining the classic reinforced rubber supports with elements made of shape-memory alloy, for the isolation of bridge decks. Dolce, Cardone and Mametto [8], using rods and wires in a shape-memory alloy, presented a prototype of the insulator and a dissipative brace.

Van Zeggeren in 1991 [9] proposed a shock absorber based on an actuator constituted by a wire spring in a shape-memory alloy.

SUMMARY OF THE DISCLOSURE

The object of the present invention is to provide a hysteretic device that solves the problems and overcomes the drawbacks of the prior art.

It is subject-matter of the present invention a device according to the annexed claims, which form an integral part of the present description.

It is further subject-matter of the present invention an element or damped mechanical structure according to the relevant enclosed claims.

BRIEF DESCRIPTION OF THE DRAWINGS

The invention will be now described, for illustrative but not limitative purposes, with particular reference to the figures of the accompanying drawings, wherein:

FIGS. 1c and 1d show front and side view of the element SD of FIG. 1b;

FIG. 2 shows the three modes of operation of the device according to the invention;

DETAILED DESCRIPTION OF EMBODIMENTS OF THE INVENTION

The invention relates to a multi-purpose mechanical device capable of providing non-linear hysteretic restoring forces with adjustable properties. The device can be used in very different applications including: (1) vibration damper, (2) hysteretic insulator, (3) energy absorber, (4) shock absorber, (5) applications which require a specific rheological system with force-displacement characteristics of the hysteretic type.

Figure 1A:
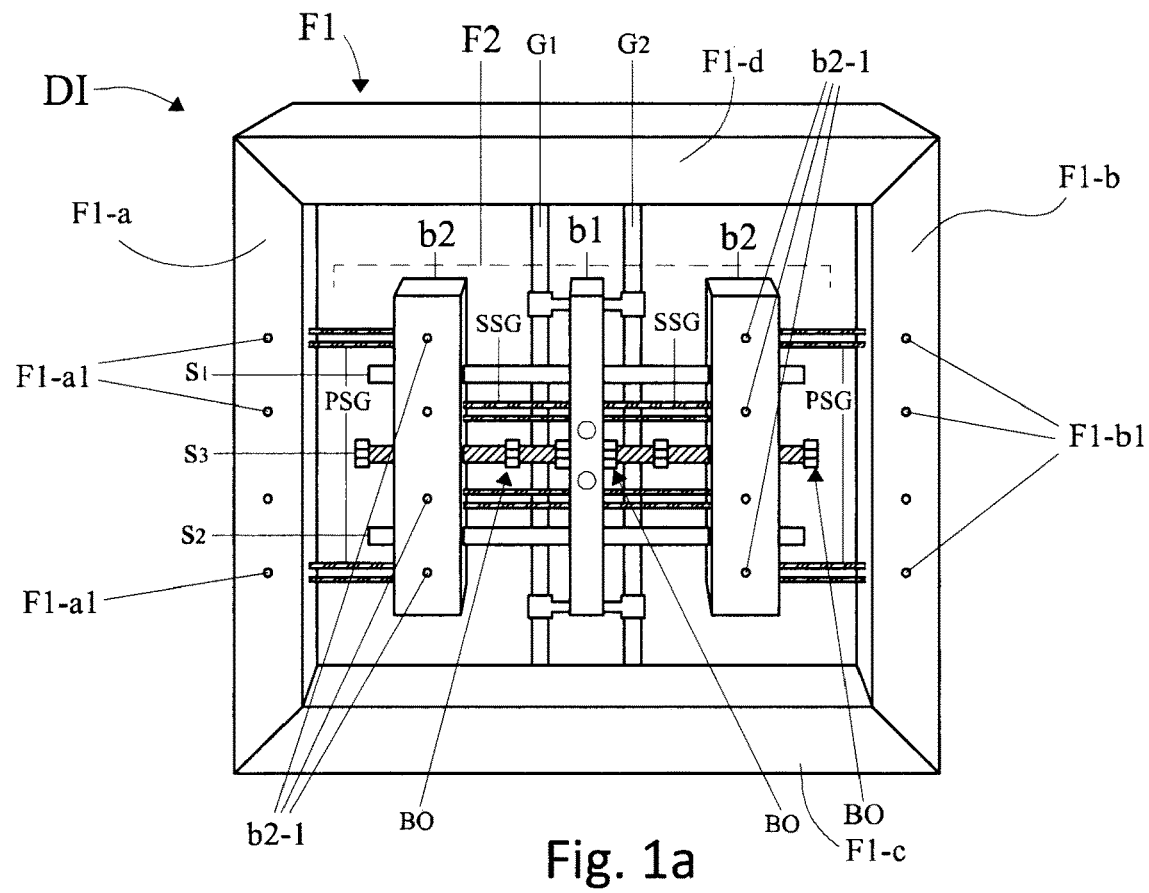
FIG. 1a shows a schematic representation of an embodiment of the device according to the invention.

In FIG. 1a, a schematic representation of a specific illustrative embodiment of the device according to the invention is shown.

The device comprises a main frame F1 of rectangular shape constituted by four rods F1-a, F1-b, F1-c and F1-d that form its sides. In the F1-a and F1-b rods, arranged along the direction that will be indicated as vertical, damping devices F1-a1 and F1-b1 are respectively placed, to which the ends of a group of ropes or cables of different type, indicated with the term PSG, are fixed. The other ends of the group of ropes PSG are fixed to two facing blocks b2 that contain joints b2-1. The ropes PSG in the resting configuration (balance in the absence of load or absence of mechanical vibrations) of the device are perpendicular to said vertical direction and then lie in the horizontal direction.

As it will be seen below, the two elements or facing rigid blocks b2 are mounted so that they are movable along the vertical direction.

Between the blocks b2 (for example in a central position with respect to them) a third element or rigid block b1 is positioned.

In general, the three blocks b1 and b2 are connected either rigidly or in such a way that the two rigid blocks b2 can move with respect to one another in the horizontal direction, though obviously affected by the restoring forces of the rope(s) PSG.

In one example, the three blocks are crossed by two smooth bars S1 and S2 (or even just a bar S1 or S2, or more than two bars, or more generally one or more horizontal guides), perpendicular to the vertical direction, which are fixed (for example in their center line) to the block b1.

The blocks b2 are supported by smooth bars S1 and S2 and can slide over them in the horizontal direction with low or adjustable friction by the interposition of bearings (e.g. bearings made of self-lubricated Teflon) or other known and future systems. The bars S1 and S2 may be each constituted by two semi-bars fixed at one end to b1.

The set of the three blocks b1, b2 and smooth bars S1, S2 (referred to as the secondary frame F2) is structured so as to have the same vertical displacement.

The third block b1 can slide in a vertical direction along at least a vertical guide, in particular at least two guides G1 and G2, (or even a single guide G1 or G2, or more guides) with reduced friction through bearings (for example, ball bearings).

The above ropes can be, for example, (1) steel wire ropes (2) shape memory alloys wire ropes (SMA, "Shape-Memory Alloy"), including Nitinol (SMA alloy consisting of nickel and titanium) or other SMA alloys (some examples of which are, without limitation, NiAl, CuSn, CuMn, CuAlNi, CuAlZn, FeTi, FePt, FeMnSi), (3) mixed ropes consisting of steel wires and Nitinol wires or other shape memory alloys, (4) individual Nitinol (or other shape-memory alloy) wires. Different combinations of these elements can be integrated into the proposed device and are subject to cyclic stresses of bending and shear and/or tension. Two mixed-rope prototypes with steel and nitinol wires and two rope prototypes entirely made by Nitinol were made. The aforesaid mixed rope is the basis of a specific application, described hereinafter, of the device.

The device according to the invention may also contain a threaded bar S3 (preferably of circular section and parallel to the smooth bars S1, S2) fixed to the block b1 (for example in the center line) which passes through the blocks b2 without touching them and on which BO bolts are screwed. The latter have the function of rigidly connecting block b1 to blocks b2 in such a way that the sliding on guides S1, S2 is prevented, and therefore there are no relative translations in the horizontal direction of the blocks of the frame F2. Bar S3 has the function of making the device usable in a versatile way according to three different mechanisms that will be subject to detailed description hereinafter. The group of PSG ropes which connects the frame F1 to the bars b2 of frame F2 represents the group of principal stiffness of the device. The device can also optionally contain a SSG group of ropes or wires (secondary stiffness group), made of steel or shape-memory alloy or also of a mixture of both materials, that connect the two bars b2 (thanks to the joints b2-1) with each other, crossing the bar b1 through suitable holes. The device can also become semi-active by passing the electric current in the cables and/or wires made of shape memory alloy constituting groups PSG and/or SSG. In this manner the thermal state of the cables and/or wires is varied by Joule effect and the mechanical properties (stiffness) of the shape-memory alloy can be adjusted in real time according to the operating needs.

In FIG. 2 the frame F1 is fixed to the piston P of a test machine (for example, of the type MTS—Material Testing System) and bar b1 of frame F2 is bound by a fork to the fixed support R of the machine. The frame F1 is cyclically moved in a vertical direction and a load cell L, positioned between the fork and the fixed support of the machine MTS, measures the restoring force of the system. The frame F1, the stiffness groups of PSG and SSG, the elements b2 and the guides G1 and G2 are represented in the respective configurations varied with dashed lines. Although the test, for performance reasons, provides for the fixing of F2 and the forced oscillation of F1, in the hysteretic device applications according to the invention actually the reverse takes place. However, the tests are consistent with the applications because the displacement that determines the nonlinear hysteretic force is relative displacement between F1 and F2. The device can be used in three operating modes represented in FIG. 2 and described below.

Operating mode M1: the blocks b2 are fixed to the threaded rod S3; when the frame F1 is subjected to vertical displacement, the group of ropes PSG is subjected to a coupled state of traction and flexion; this mechanism induces a strong geometric non-linearity which results in an increasing stiffness mechanical behavior (also called "hardening"). For this specific mode, the frame F2 could also be constituted by a single rigid body able to slide on the two guides G1 and G2.

Operating mode M2: the blocks b2 are free to slide on the smooth bars S1 and S2. Although bar S3 is shown, this plays no role and can be omitted. When the F1 frame is subject to vertical displacement v, the blocks b2 are free to move horizontally toward the frame F1 (with horizontal displacement u); in the group of PSG ropes, a state of pure bending with a double curvature is induced, which results in a decreasing stiffness force-displacement behavior (also called "softening").

Operating mode M3: the blocks b2 are connected with the group of ropes or wires SSG, but are not fixed by the threaded bar, and then they can slide on the smooth bars S1 and S2 causing the elongations of the SSG group (equal to two times u); when the frame F1 is subjected to vertical displacement v, in the SSG ropes traction cycles are produced while in the PSG ropes a coupled state of bending and traction is generated; the size of the "hardening" effect depends on the stiffness ratio between the two groups of ropes. Although S3 bar is shown, this plays no role and can be omitted.

The restoring forces provided by the device are of non-linear hysteretic type, whose stiffness properties vary with continuity during the stages of loading or unloading (i.e. the stiffness of the device, represented by the derivative of the restoring force with respect to the displacement, is a continuous function of the displacement except in the reversal points of the displacement speed, or points of reversal of the sign of the load direction), undergoing discontinuous changes in the points of load-unload reversal and vice versa. The dissipative capabilities are due to two mechanisms: 1) the internal friction between the wires subjected to relative sliding, and (2) the phase transformation of austenite-martensite (under loading) and vice versa (under unloading) induced by the variation in the tension-deformation state in the shape-memory alloy. The concomitance of these dissipative mechanisms determines a hysteretic force-displacement cycle (relative displacement of F1 with respect to F2) characterized by a variation of the dissipated energy, which is incremented during the loading phase and is reduced during the unloading one. This results in the force-displacement cycles with an effect known as "pinching", thanks to which one has inflection points in the loading/unloading curves and a symmetric narrowing of the response curve around the origin point. In the operating modes M1 and M3, thanks to the tensile forces which develop in the PSG, there is a non-linear effect of geometric type which determines an increase of the stiffness with increasing displacement amplitude.

Figure 3:
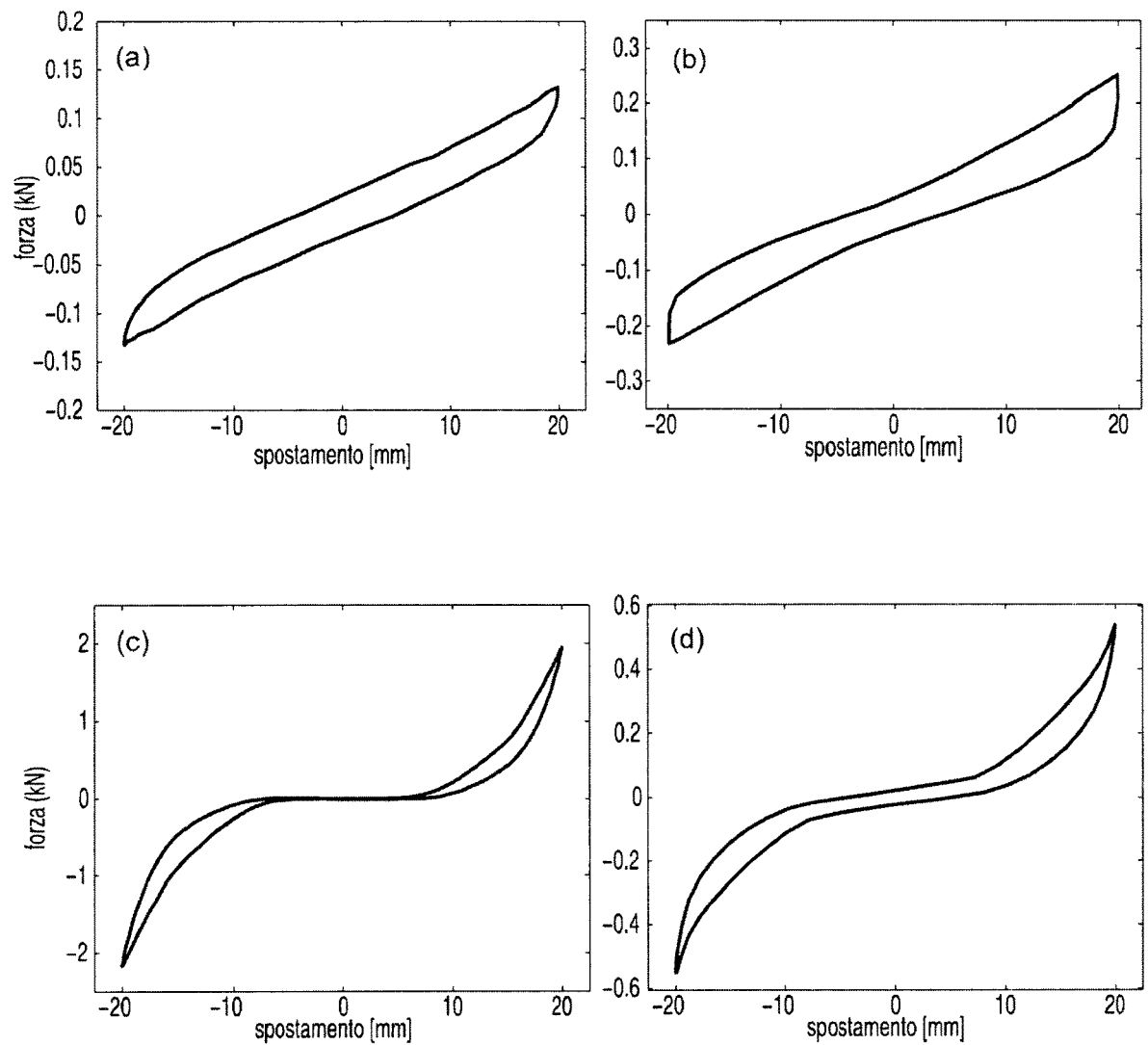
FIG. 3 shows the restoring forces obtained experimentally with the rheological device according to the invention: (a) almost-linear softening, (b) quasi-linear softening with pinching, (c) hardening with strong pinching and (d) softening-hardening with pinching.

The restoring forces obtained using the three different modes (M1, M2 and M3) with use of various ropes are represented in FIG. 3. The curve in FIG. 3(a) has been obtained with the device in the M2 mode by using steel ropes as PSG. In this case, the dissipation is due to the friction between the wires and the force-displacement relationship is of quasi-linear softening type; a result similar to that of the patent application device [3] is obtained. The constitutive behavior in FIG. 3(c) was obtained with the device in the M1 mode and ropes entirely consisting of Nitinol as PSG Group. The hardening effect is of geometric type and is induced by the traction forces developed in the ropes. The damping is given by the friction between the wires and the phase transformations of NiTiNOL that are of prime importance. The curve in FIG. 3(d) was obtained with the device in the M3 mode and using steel ropes as PSG and wires of Nitinol as SSG. In this configuration, a damping is provided both by the friction and by the martensite-austenite phase transformations. The constitutive behavior softening with pinching, represented in FIG. 3(b) is obtained by using the device in the M2 mode and the main group of stiffness PSG consists of steel-Nitinol mixed ropes. The pinching is due to the simultaneous presence of friction between the wires and phase transformations of the Nitinol. The friction provides a constant energy dissipation rate during the loading/unloading cycles. The Nitinol has a martensitic transition at the load application and an austenitic transition at the removal of load with the return to the elastic branch. This determines the variation of the rate of dissipation along the cycle producing the pinching effect.

Figure 4:
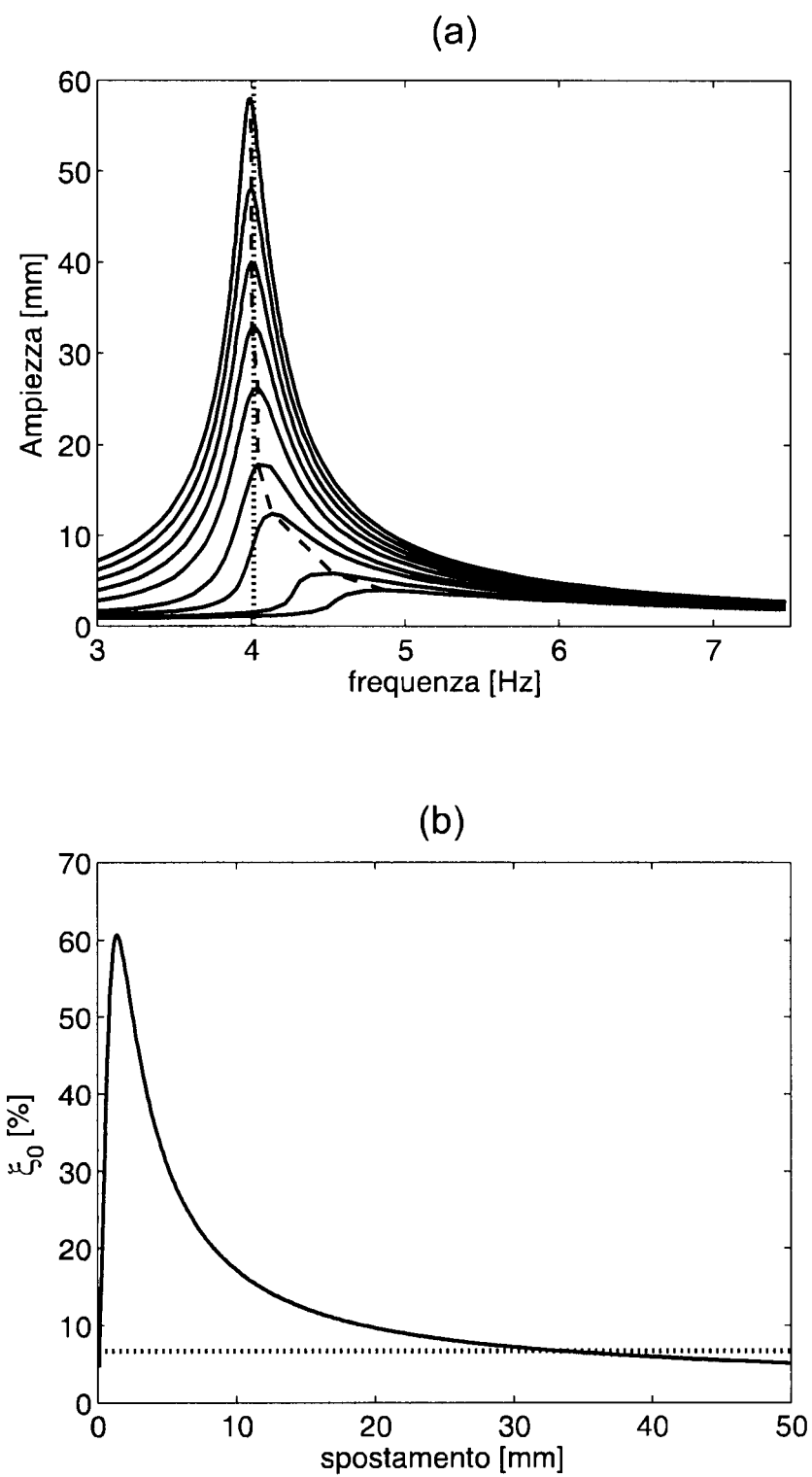
FIG. 4 shows in (a) the frequency response curves for different levels of excitation of a mass connected, by the device of the softening with pinching type, to a basis undergoing periodic motions; in (b) the progression of the equivalent damping as a function of the shift amplitude for the softening with pinching type behavior (M2 mode); the dotted lines represent constant values to which the resonant frequency and damping tend.

The latter constitutive behavior (FIG. 3(b)) is particularly suitable for the realization of a so-called "tuned-mass damper" for the damping of mechanical vibrations. The feature that makes this constitutive behavior an optimum one for the realization of a non-linear hysteretic damper consists in the existence of a swing range in which the ratio between dissipated energy and elastic energy as well as the average equivalent stiffness turn out to be almost constant unlike others visco-elastic or hysteretic devices. In FIG. 4(a) the curves of the frequency response of the overall mass of the frame F2 are shown for different levels of excitation with the device in the M2 mode that uses mixed Nitinol-steel ropes as PSG (i.e. softening behavior with pinching of FIG. 3(b)) and with F1 rigidly connected to a base, which is subject to periodic oscillations at different frequencies. Exceeded a threshold shift, the system's resonance frequency assumes a constant value. In FIG. 4(b), the trend of the equivalent damping (proportional to the ratio between dissipated and elastic energy) is represented as a function of the oscillation amplitude. After an initial peak, the damping becomes almost constant. This is due to the martensitic phase transformations that occur for large displacements. The just highlighted behaviors were confirmed by experimental measurements.

Embodiment for Tuned-Mass Damper

Figure 5:
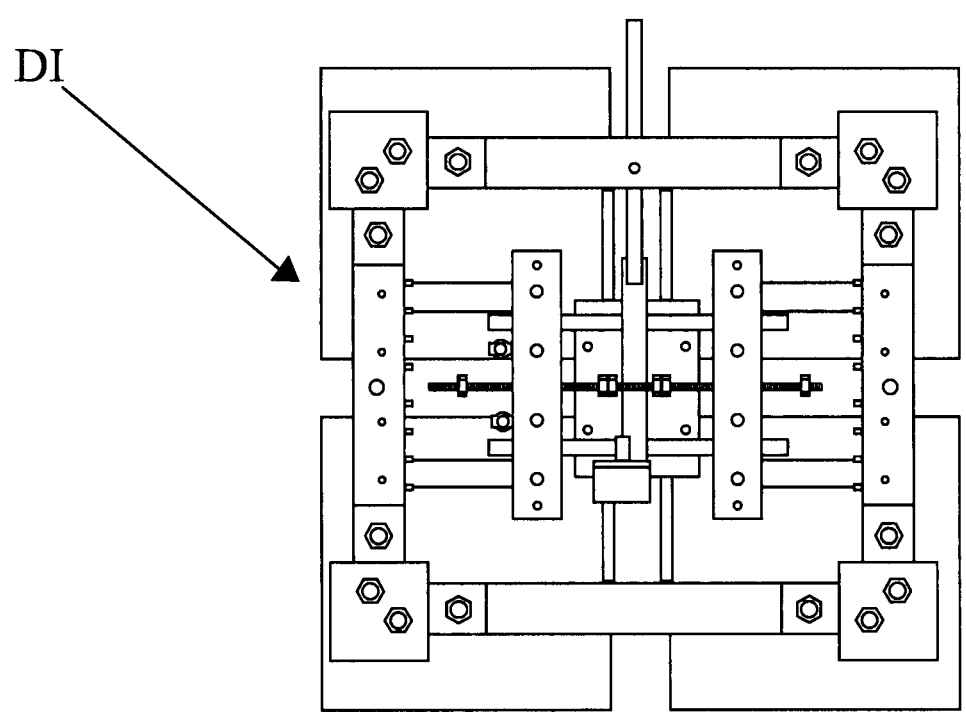
FIG. 5 shows the device according to the invention mounted in a horizontal position on a shaking table.

FIG. 5 shows the device horizontally mounted on a vibrating table. The frame F2 can slide on the two vertical linear guides of FIG. 1a by the ball bearings. The frame F1 is rigidly connected to the vibrating table, which is subject to imposed motion while the frame F2 is the oscillating mass. The configuration of FIG. 5 is the mode by which it is possible to experimentally obtain the frequency response curves of the device, which can operate in three different modes M1, M2, and M3.

Figure 6:
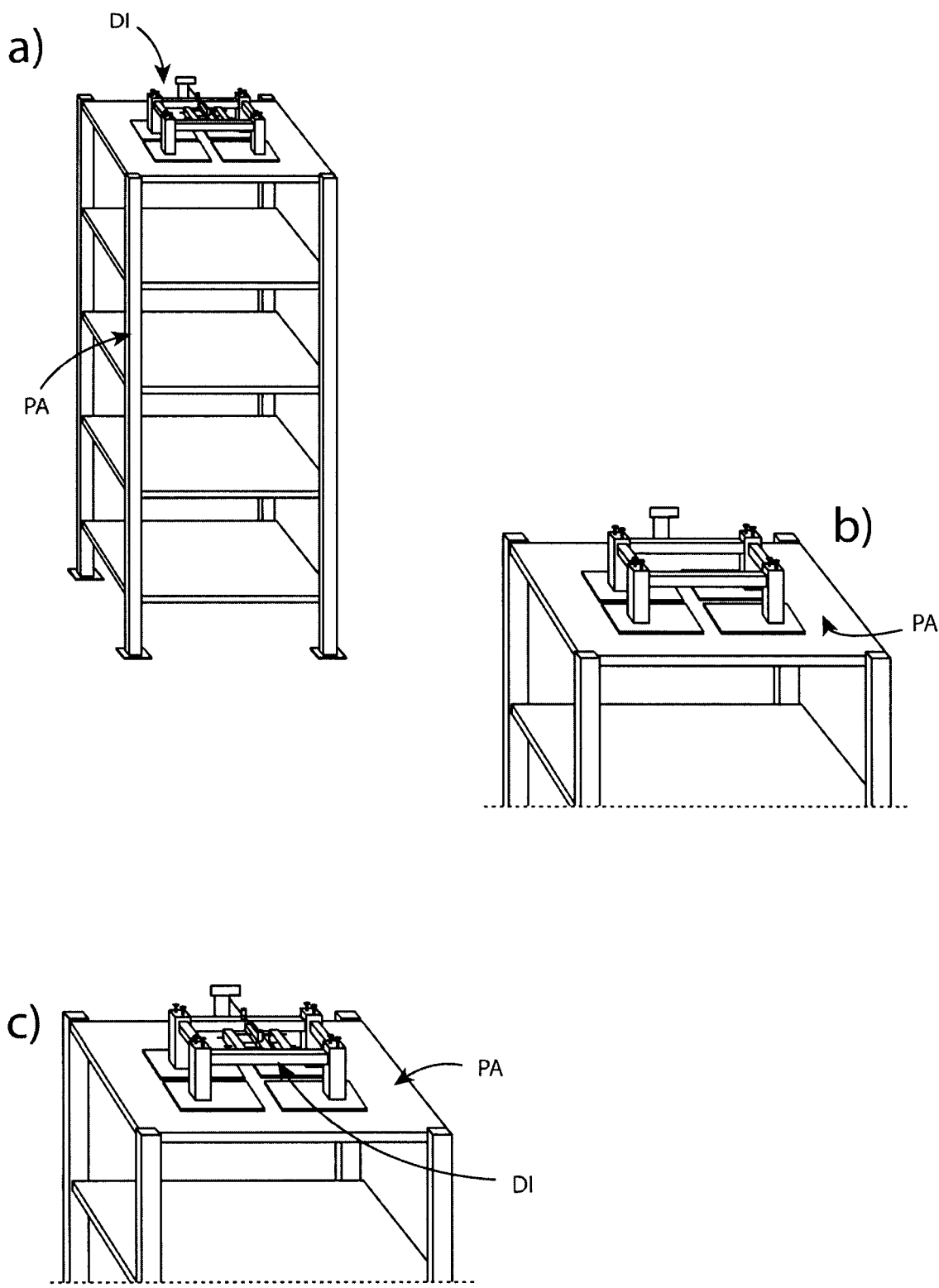
FIG. 6 shows at (a) a five-storey building with the damper positioned at the last floor, in (b) the non-controlled configuration, and in (c) the controlled configuration.

The configuration of device DI in FIG. 6 represents the embodiment as a tuned-mass damper in the case of a multi-storey building. The frame F1 is fixed on the structure PA to be controlled (see FIG. 6 (c)) and F2, oscillating relatively to it, applies the control force as reactive forces at the connection points between F1 and the main structure. In FIG. 6 (b) only the frame F1 is fixed, having removed the frame F2. In this way, it has been possible to compare the controlled and uncontrolled oscillations of the fifth floor of structure PA.

The non-linear vibrations absorbers present in the prior art show a limit in the loss of tuning, and thus loss of performance to attenuate the vibrations of a main structure, because of the significant variation of damping and resonant frequency with varying oscillation amplitude. The softening with pinching type behavior is able to overcome this drawback by exploiting the range of amplitudes in which both the resonant frequency and the damping keep almost constant. Furthermore, the device according to the invention may use tuned masses of high weight, thanks to the vertical guides (which support the weight), and eliminate the effects due to the rotation of the tuned masses, thanks to the horizontal guides (that bind them to translate along a straight direction).

If two dampers tuned to the frequencies of two independent modes of the structure are used, and the relevant guides are arranged orthogonally, on which the oscillating masses slide (without connecting the two tuned dampers), a bi-directional damping system is obtained, which has ability of control on the two selected modes. In general, using multiple devices with tuned masses, which oscillate in different directions with appropriately adjusted restoring forces, it is possible to control the number of modes representative of the dynamic behavior of the main structure (including torsional modes). For the tuned-mass damper application, the F1 frame could also be integrated in the main structure, for example, housing directly on it the joints for the ends of the ropes PSG and the fasteners for the guides G1 and G2.

The performance of the damper have been evaluated experimentally considering a reduced scale multi-storey steel building mounted on a vibrating table. The damper has the task of dampening oscillations dominated by the first mode of vibration of the frame structure, the oscillations being induced by a harmonic motion at the base.

FIG. 6 (a) shows the entire multi-storey building located on the vibrating table and the absorber according to the invention housed on the top floor. In FIGS. 6 (b) and (c), the non-controlled configuration (without F2) and controlled (with F1 and F2) are shown, respectively.

Figure 7:
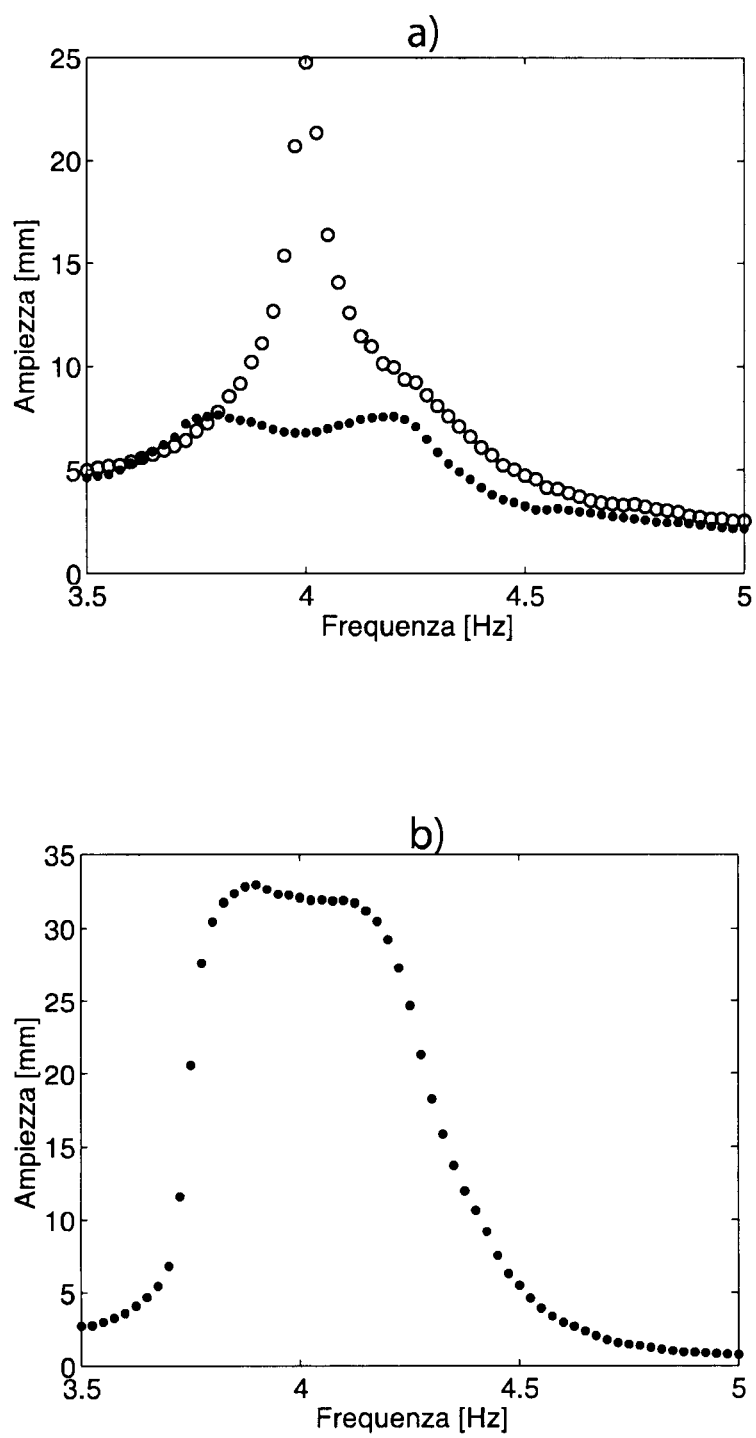
FIG. 7 shows at (a) of the experimental frequency response curves of the top story of the building for the not controlled configuration (circles) and controlled (dots); in (b) the experimental frequency response curve of the damping device.
Figure 8:
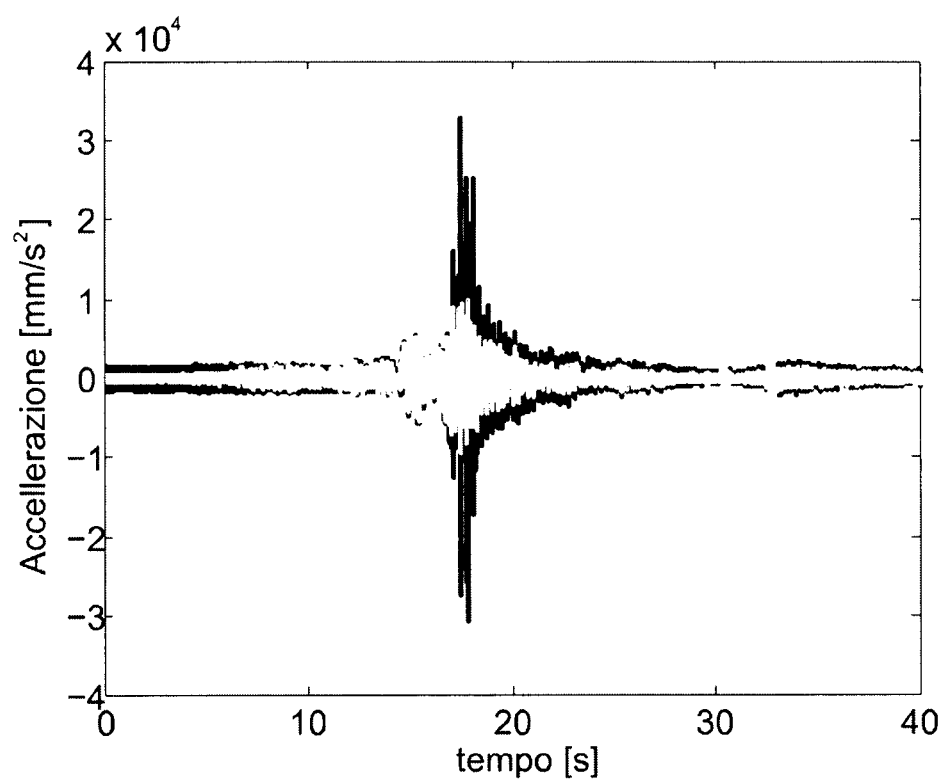
FIG. 8 shows the acceleration response of the fifth story of the frame for a seismic type motion at the base in the controlled case (gray) and not controlled case (black)

The frequency response curves of the fifth storey of the non-controlled frame (represented by circles without filling color) and controlled frame (represented by circles with filling black color) are compared in FIG. 7 (a) for a given level of amplitude of the forcer. The device is able to reduce by about 70% the shift in resonance of the fifth storey. The corresponding frequency response of the damper is shown in FIG. 7 (b). The performance of the hysteretic damper was also evaluated against seismic motions at the base. FIG. 8 shows the experimental response in acceleration of the fifth storey of the frame in a controlled configuration (by the gray curve) and not controlled configuration (by the black curve), while considering a seismic accelerogram imposed to the base. The peak in acceleration is attenuated by more than 70% and the Arias intensity of the controlled and not controlled response, respectively, is equal to 0.321 m/s and 1.43 m/s.

Embodiments for Vibrations Isolation, Dissipative Bracing, Shock Absorber.

Figure 9:
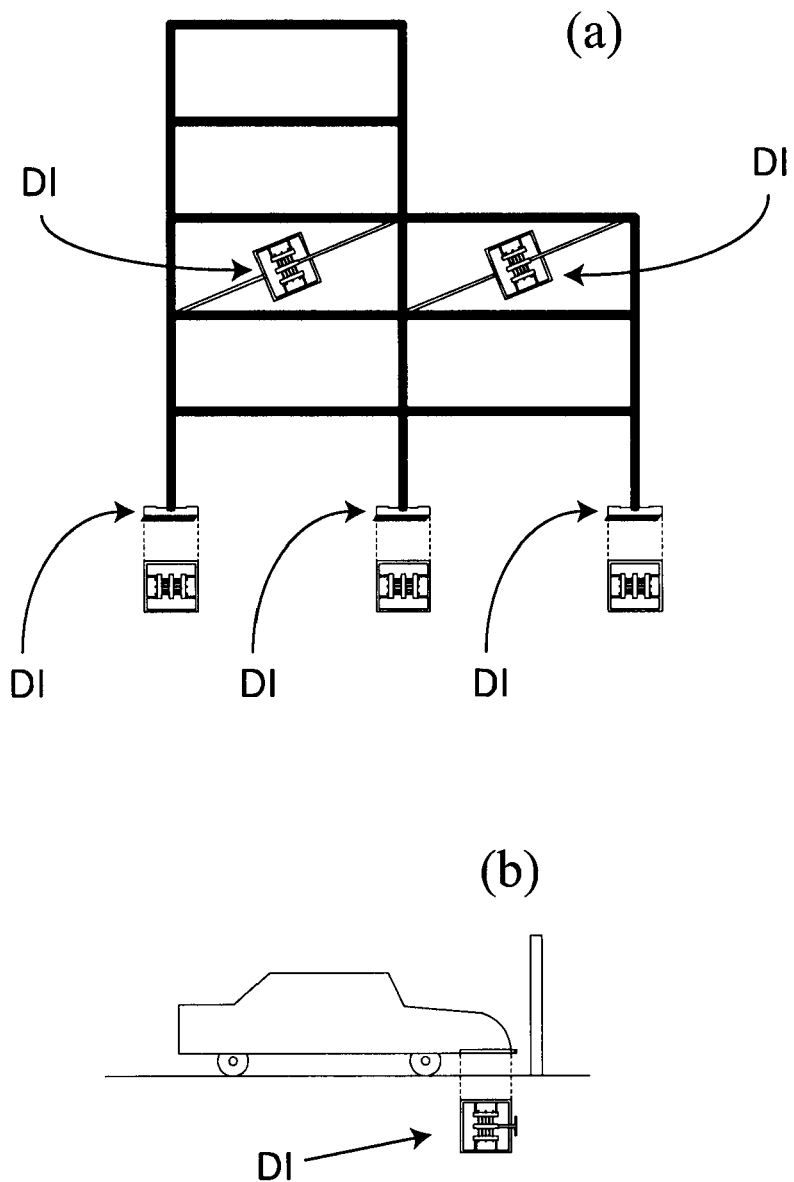
FIG. 9 shows some uses of the device according to the invention: in (a) as hysteretic isolator (at the base of the pillars of a load-bearing skeleton building) and dissipative brace (in the oblique rods which absorb part of the horizontal forces acting on the building); in (b) as a shock absorber (shock absorber) integrated in the bumper of a vehicle to absorb and dissipate energy due to a collision against obstacles.

The hysteretic mechanism, obtained with ropes and wires of different kind constituting the principal group of stiffness PSG and the possible secondary stiffness group SSG integrated in the device described above according to the three different operating modes (M1, M2 and M3), can be used effectively as hysteretic isolator, dissipative bracing and shock absorber. A schematic representation of these applications is shown in FIG. 9.

The device can be used as hysteretic insulator for structures, equipment or components of various sizes and shapes. FIG. 9 (a) shows three devices DI situated below the vertical bearing elements (termed pillars) of a building, and having hysteretic isolators function. By connecting the base of a pillar (P) to the block b1 and fixing the frame F1 to a structure integral to the ground (foundation), a hysteretic isolator is realized (see FIG. 10 (a)), whose optimum constitutive behavior can be realized by exploiting several assemblies of integrated ropes in the three modes of functioning M1, M2, and M3. The use as hysteretic insulator in a civil structure is purely indicative, since the device can be used for any main structure sensitive to deterioration effects of vibrations, such as for example: biomedical, nuclear, mechanical precision equipments; towers, silos, storage tanks. This list is partial, while using the device according to the invention is general, since it deals with any isolation application context, meaning by the latter the relative translation of a body with respect to another body regulated by the restoring force exerted by the device itself that causes a significant reduction of the isolated body resonance frequency.

Figure 11:
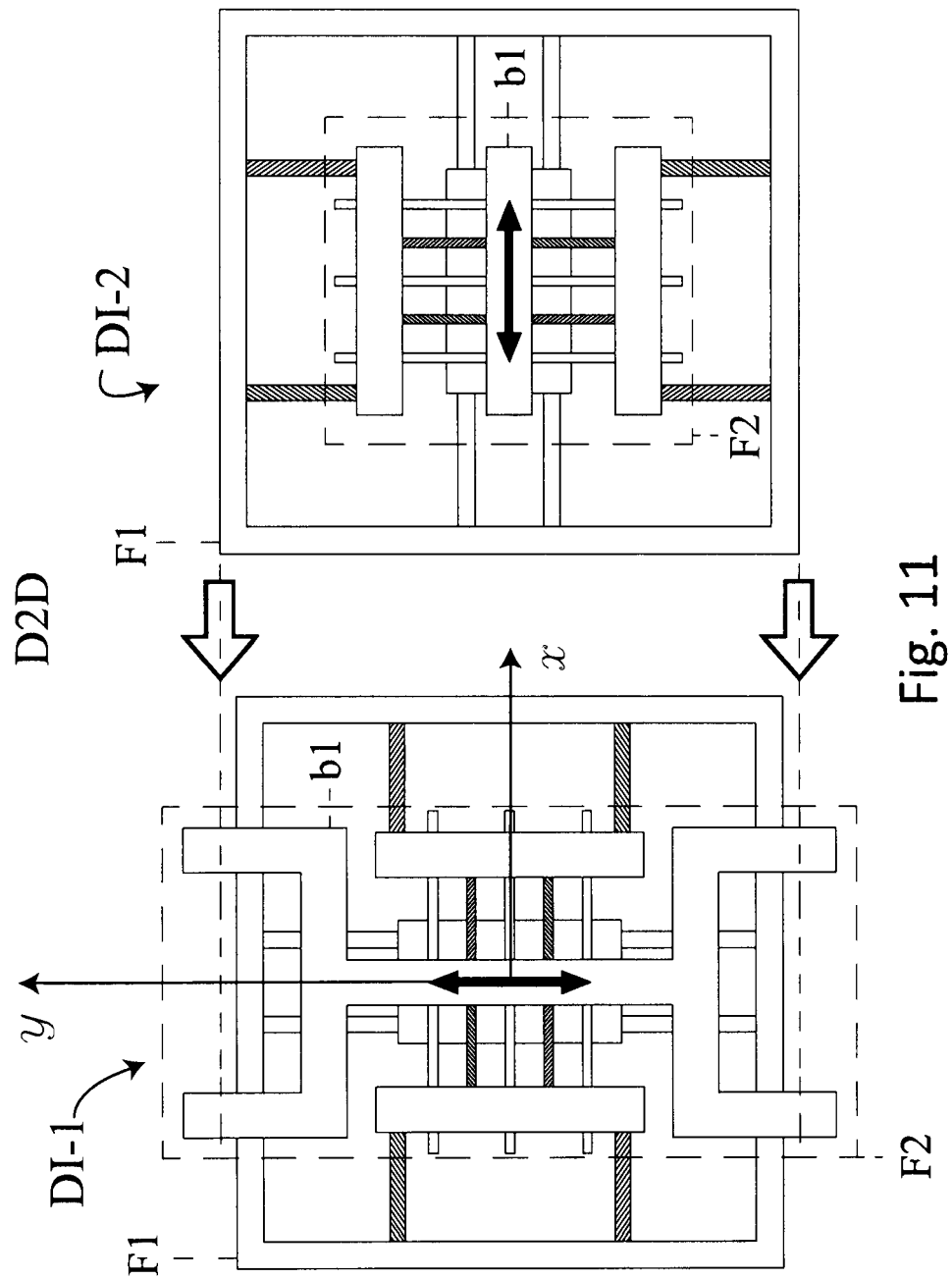
FIG. 11 shows the bi-directional device according to the invention obtained by overlapping two unidirectional devices according to the invention.

The insulator can be modified from unidirectional to two-directional in order to allow displacements in two orthogonal directions. FIG. 11 illustrates the bi-directional insulator formed by the superposition of two unidirectional devices, "DI-1" and "DI-2". The frame F1 of the device DI-1 is fixed to the source of the undesired motion and element b1 of the DI-1 device is modified to accommodate the frame F1 of device DI-2. In this way the entire device DI-2 moves in the y direction together with the frame F2 of the device DI-1 and, in turn, the device frame F2 of the device DI-2 can translate in the x direction. The body to be isolated is connected to the element b1 belonging to the frame F2 of the device DI-2 and, accordingly, it is subject to the hysteretic restoring forces in the two orthogonal directions along which it can move.

Figure 10:
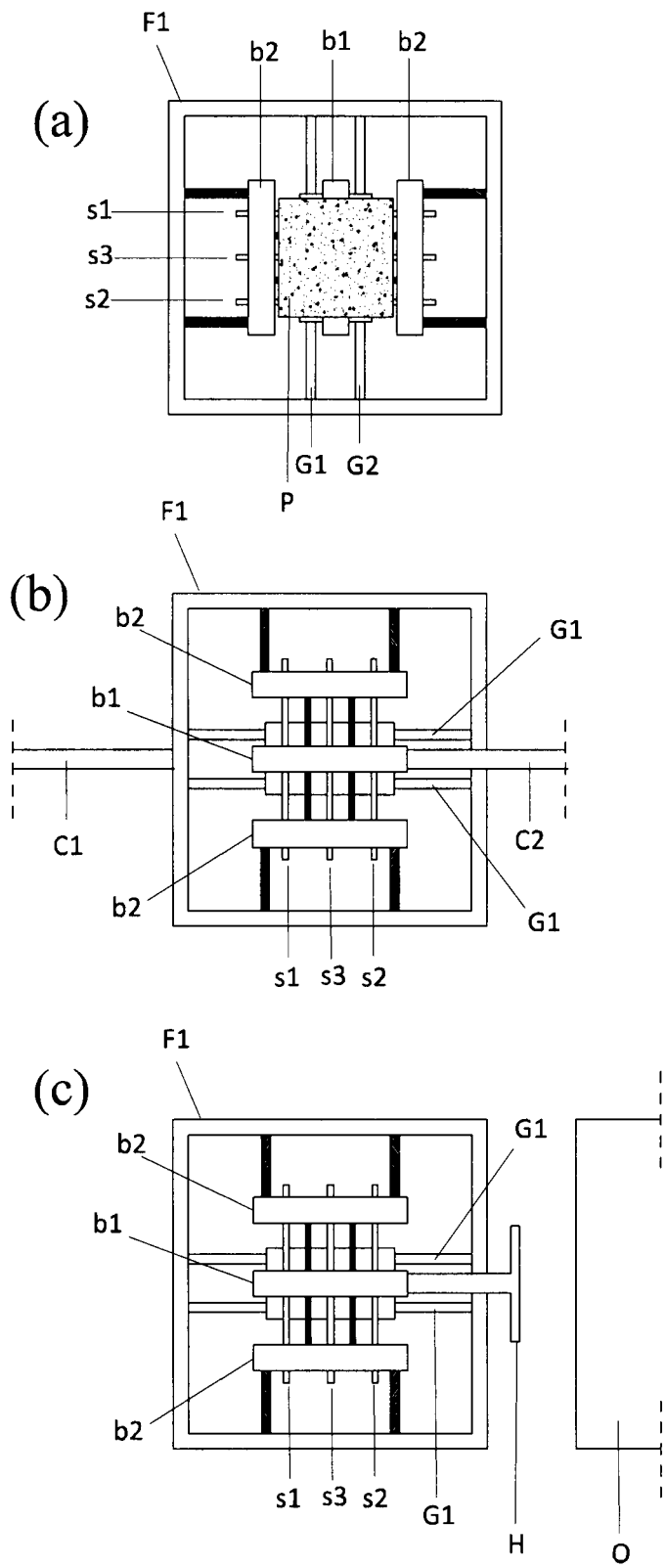
FIG. 10 shows a use of the device, in (a) as hysteretic insulator, in (b) as dissipative upwind or more generally as an energy absorber, in (c) as a shock absorber.

The braces are rods which are inserted inside the frames of a structure (e.g. a movable nodes building, i.e. connected with beams and columns connected to each other by hinges and not by joints) with the purpose of stiffening or eliminate the lability in the horizontal direction. The technology of the brace dissipative consists in inserting in the brace a deformable element which is able to dissipate energy when subjected to displacement cycles caused by an action on the main structure (for example of wind or seismic type for buildings), mitigating its overall response. In FIG. 9 (a) a schematic representation of two dissipative braces is shown, which are realized with the proposed device DI positioned in the frame of a building. The device according to the invention is to be used in this case as a dissipating element. In FIG. 10 (b) an enlargement of that operation is shown, in which a first rod C1 rigidly connects the frame F1 to a node of the main frame, and a second rod C2 rigidly connects another node of the frame to the block b1 of the frame F2. The relative movement of the frame nodes activate the device that dissipates some of the energy supplied by an external action, attenuating the stresses on the frame. This type of operation can be exploited not only in the braces but in any other type of structure biased in any manner, in such a way that the relative motion of two parts of the structure is transferred to the frames F1 and F2 of the device DI. Taking advantage of the different device configurations, it is possible to optimize the constitutive behavior for the specific application. The term "dissipative brace" is purely indicative because the subject of the claim is the use of the device for introducing localized dissipation elements in a given structure (for example, the chassis of a motor, transportation means).

The shock absorber (see FIG. 10 (c)) consists in fixing the frame F1 of the device according to the invention to the main body on which the effect of the impact action against the obstacle O is to be mitigated and connecting, to element b1 of frame F2, a rigid arm H whereon the obstacle impact. The impact is mitigated by the nonlinear and hysteretic restoring forces produced by the optimized device, as in the above cases, based on the characteristics of the specific problem. By way of example, in FIG. 9 (b) the device having shock absorber function is represented integrated in the bumper of a car just before impacting against an obstacle. The device can be used as shock-absorber of different structures, equipment or components thereof in a different scale of magnitude.

The applications presented in this document (tuned-mass damper, isolator, dissipative brace, shock absorber) in fact share the characteristic of exploiting, for the purposes of their operation, the restoring force exerted by the assembly of various ropes and wires (for example made of steel, mixed Nitinol-steel, Nitinol only and in steel only) in the specific mechanism that can operate in three modes of operation (M1, M2, M3).

Additional Embodiments

Figure 1B:
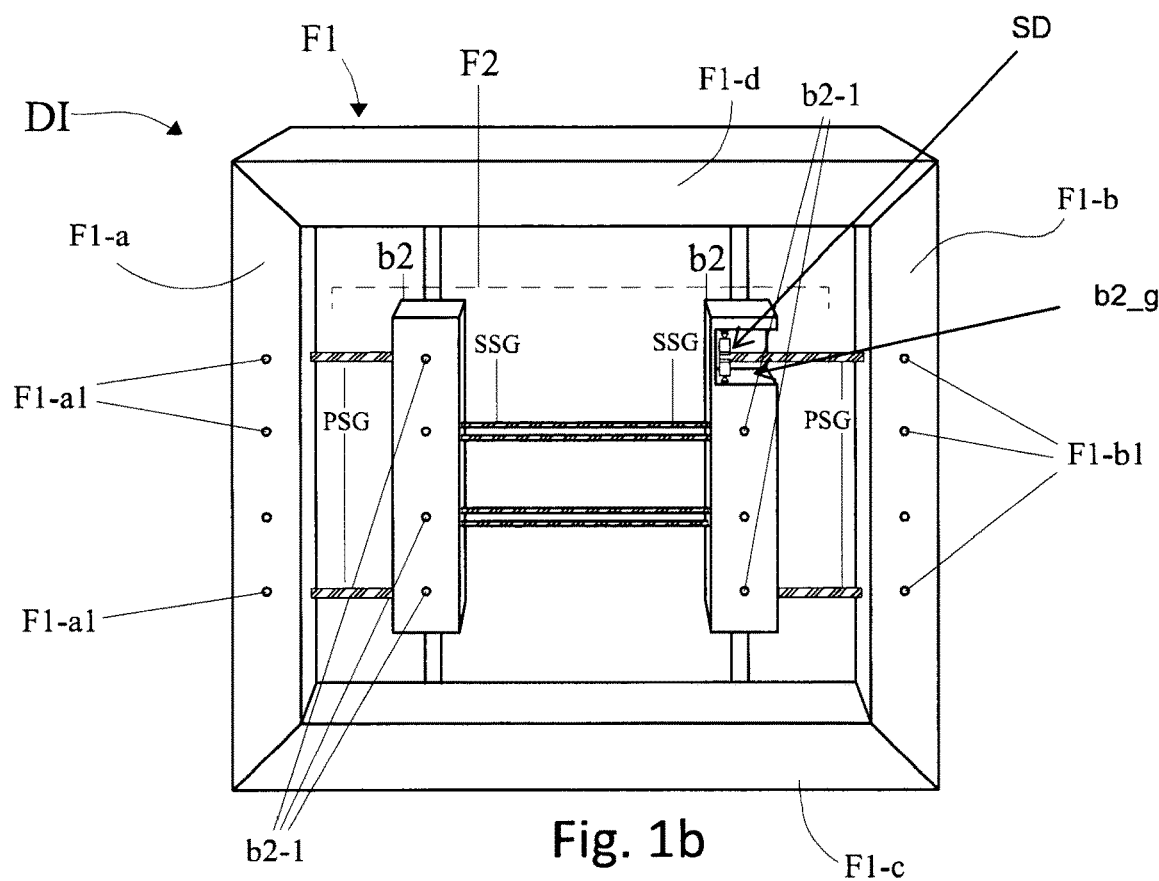
FIG. 1b shows a different embodiment according to the invention.

Referring to FIGS. 1b, 1c and 1d, a different embodiment is described, that implements in a different way the multiple sliding mechanism according to the invention. In fact, in this embodiment, there is no central block b1, and b2 are fixed slidably to one or more guides (two separate guides in the drawing, but they can also be combined or be a single guide), while the connection between the side wire and b1 is the of sliding type. For example, this connection may be a vise device SD (with its parts SD_1 and SD_2) that attaches to the end of the wire PSG and is provided with bearings for SD_B to slide within a seat $b2\_g$ formed in the block b2. In the figure, only one of these devices is shown, but it is provided for all the wire-b2 connections. In this way, when b2 slides vertically, the device at the end of the wire slides within its seat, avoiding to induce in the wire a state of hardening (only one wire PSG is shown, but there may also be more wires).

The sliding system of the wire rope may be such as to adjust its friction, i.e. such as to provide a given level of friction to sliding.

Figure 12:
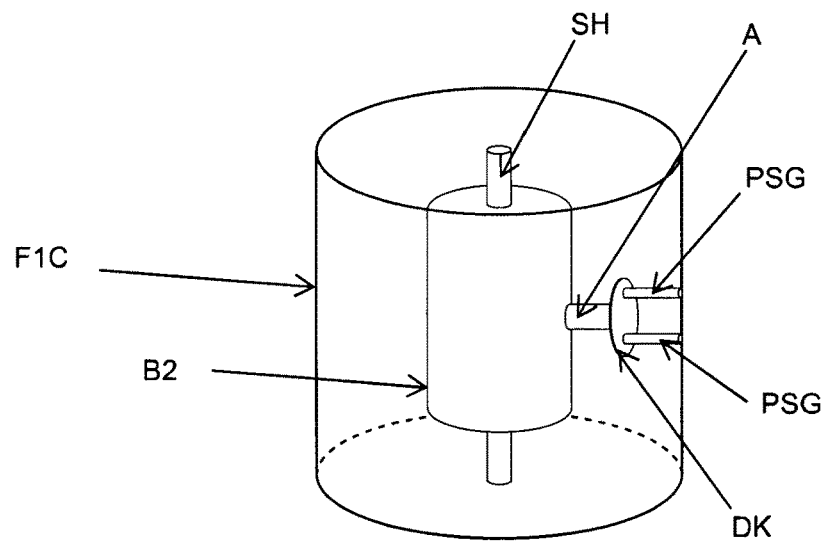
FIG. 12 shows a further different embodiment of the present invention for aviation applications (i.e., mitigation of vibrations and increase of flutter stability margins in airfoils or more generally in aerodynamic surfaces)

Referring now to FIG. 12, a case in which there is only one tunable mass B2 connected with PSG wires to a frame F1C (for example, cylindrical) is illustrated. The mass B2 slides vertically along a central axis SH (or is connected to a guide of another type). The strand-central mass connections are provided with the above device (FIGS. 1c-1d, not shown in FIG. 12) for the horizontal sliding within a disk DK connected to the central mass by a sleeve A. The effect is similar to that of the embodiment just described, but the configuration of this design is more suitable for applications for the control of mechanical, aeronautical and aerospace structures. Examples include the mitigation of vibrations induced by gusts or the flutter phenomenon for the wings of aircrafts or other aerodynamic surfaces like the rudder or lateral stabilizers. Another field of application can be that of the transportation systems on ropes such as cable cars or materials tape transportation systems. The device in this case can be used to control unwanted oscillations of passenger cabins or the support pylons of the ropes or tapes.

Figure 13:
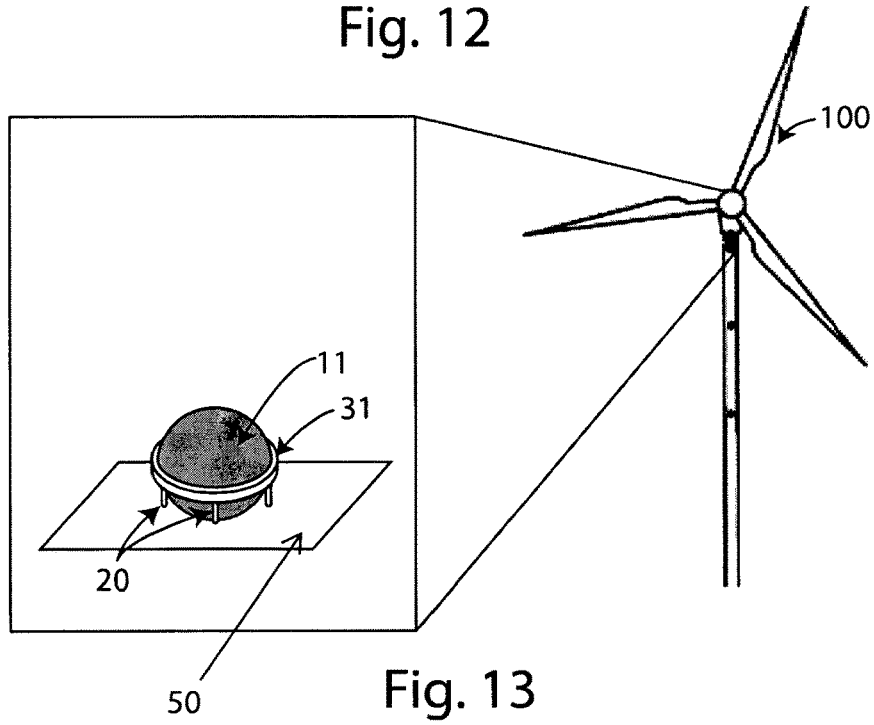
FIG. 13 shows a further different embodiment for civil applications in vertical constructions.

Finally, referring to FIG. 13, another embodiment for the damping of vertical structures is described, such as wind towers 100 or skyscrapers.

This embodiment starts from that of Application WO2013042152 but introduces important differences. First, the wire connection 20—tuned mass (sphere) 11 (for example by a ring 31) uses the slider referred to in FIGS. 1b-1d (not shown in FIG. 13) for the wires. In the second place, the spherical mass 11 is placed on the ground. The lower support frame 50 can be flat or slightly concave. Third, the wire ropes attached to the ceiling (upper frame) are no longer present. In this way, the hardening behavior of the wires is entirely avoided and then a much more convenient and feasible force-displacement diagram is obtained, with an almost linear restoring force.

Also in the embodiments of FIGS. 1b-1d and 13-14 the shape-memory material can be used as described above for the other embodiments.

Figure 14A:
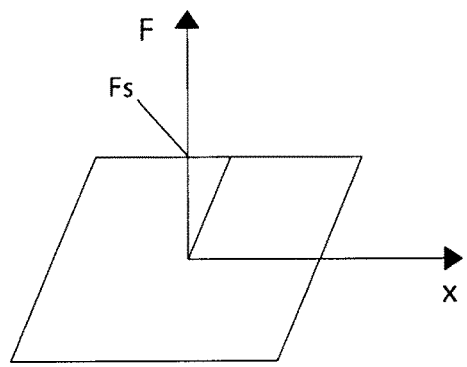
FIGS. 14a and 14b show respectively the elastoplastic behavior and perfect plastic behavior wherein F indicates the force that opposes the sliding x while Fs indicates the force for which there is sliding.
Figure 14B:
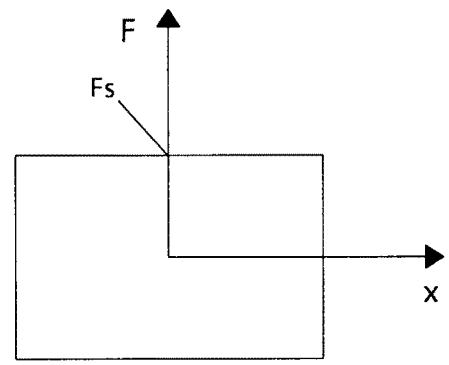

The just described configuration of the device shown in FIG. 1b and FIG. 2 and the configurations M2 and M3 can be implemented with a modification useful to introduce additional damping in the device. Specifically, the truck in FIGS. 1c and 1d becomes a truck with friction able to slide freely if the force acting on it in the sliding direction exceeds a certain adjustable threshold. At the same time, in the M2 configuration the sliding of the elements b2 on bars S1 and S2 takes place in the presence of a certain level of friction that is adjustable by determining the free sliding only when it exceeds the boundary sliding force. In configuration M3 the same behavior can be obtained by introducing, as a SSG, structural elements capable of providing in said horizontal direction an elastic-plastic or plastic-perfect behavior. Ultimately, both in cases in which the truck with friction is present both in configurations M2 and M3, the force-displacement law of the truck provided with friction or of blocks b2 along S1 and S2 takes place with an elastic-plastic behavior (FIG. 14 a) or plastic-perfect (FIG. 14 b). In FIGS. 14 a) and b) the elasto-plastic and perfect-plastic behavior are respectively represented wherein F indicates the force that opposes the sliding x while Fs indicates the force for which there is sliding. In this way, when the external stress is such to activate the constant force sliding, greater energy dissipation is obtained without varying the overall stiffness of the device.

General Embodiment

Referring to all the figures above, the hysteretic device DI for passive control of the mechanical vibrations due to translational motion includes, in one aspect, at least one frame F1 to which at least one rigid element b2 is connected by a plurality of wire ropes PSG, which are substantially straight in the unload condition.

According to the invention, the wire ropes PSG are mutually parallel along a direction, termed horizontal direction, in the condition of absence of mechanical vibrations.

Always according to the same aspect of the invention, there are two facing rigid elements b2 connected through wire ropes PSG at opposite walls of said at least a frame F1. The two facing rigid elements b2 are movable along a vertical translational direction that is perpendicular to said horizontal direction.

So far characteristics have been described which are also present in the prior art. The hysteretic device DI, however, further includes specific features of the present invention.

The first feature is the presence of a third rigid element b1 positioned between said two facing rigid elements b2 and connected to these by means of a movable connection system S1, S2, SSG that allows only the reciprocal motion of the two facing rigid elements b2 along the horizontal direction.

The second feature regards always the rigid element b1, which according to the invention is mounted in a sliding manner along at least one guide G1, G2 which extends along the vertical direction and has two ends, which are secured to the at least a frame F1.

The specific mode for implementing movable connection system can vary. For example, at least a straight bar S1, S2, on one side, and two facing rigid elements b2 with means for the sliding on said at least one straight bar, on the other side, may be provided. In particular, the means for sliding are configured in such a way to minimize the friction or to adjust it to a predetermined value.

Still, in another example, the movable connection system comprises one or more elastic and dissipative interconnection elements, in particular wire ropes SSG, interconnecting the two rigid elements b2.

The same basic inventive concept can be achieved with a relative sliding placed in a different position. In fact, the two facing rigid elements b2 may be connected to said wire ropes PSG by a sliding system SD configured to allow the relative motion between the rigid element and b2 respective wire rope PSG along the horizontal direction. In this case, the two facing rigid elements b2 are mounted in sliding manner on at least one guide G1, G2 which extends along the vertical direction and has two ends, which are fixed to said at least a frame F1. In fact, the guides can also be fixed to only one side of the frame, if the whole is sufficiently rigid (or possibly also to more sides).

According to a particular example, each of the two facing rigid elements b2 is mounted on a respective guide G1, G2, attached to one or more sides of the frame.

The same basic inventive concept of the above embodiments can be implemented even differently. Here also, at least a frame F1C is comprised, to which a rigid element B2 is connected by a plurality of wire ropes PSG, which are substantially straight in the unload condition. Always equally, the wire ropes PSG are mutually parallel along a direction, termed horizontal direction, in the condition of absence of mechanical vibrations.

Here the rigid element B2 is movable along a vertical translational direction that is perpendicular to said horizontal direction.

It is connected to said wire ropes PSG by a sliding system SD configured to allow the relative motion between rigid element B2 and respective wire rope PSG along said horizontal direction. At the same time, the rigid element B2 is mounted in a sliding manner on at least one guide SH which extends along said vertical direction and has two ends, which are fixed to said at least one frame F1C.

In all the examples referred to above, in which the sliding system SD is provided, this is configured to provide a certain level of friction to sliding.

A further embodiment of the same basic inventive technical concept is still possible, in which at least a frame 50 is included, to which at least one tuned mass 11 is connected by connection means. Such connection means are constituted by a plurality of wire 22 ropes 20, which are substantially straight in the unload condition. The at least one tuned mass 10 is movable along at least one direction of translation. The wire ropes 20 are connected at one end directly to said frame and at the other end directly to said at least one tuned mass 11, so that they are substantially perpendicular to said at least one direction of translation in the absence of load conditions.

In this case, however, the tuned mass is a spherical mass 11 resting on said frame 50, therefore with a feature of symmetry. The spherical mass 11 is connected, through a plurality of wire ropes 20 aligned in the direction of the force of gravity, and arranged with radial symmetry with respect to the spherical mass 11, to the frame 50.

Another important feature in this example is that the connection between each wire rope 20 and said at least one tuned mass is constituted by a sliding system SD configured to allow the relative motion between the at least one tuned mass B2 and the wire rope PSG along the direction of the force of gravity.

In all the examples above illustrated, the elastic and dissipative interconnection elements SSG (wire ropes or other equivalent in function) can be chosen in such a way as to provide in said horizontal direction a dissipative elasto-plastic or plastic-perfect behavior.

The wire ropes PSG and/or said further wire ropes SSG may be made of steel. Or, they may include a plurality of steel wires and a plurality of wires made of shape-memory material. Or again, the wire ropes PSG and/or the additional wire ropes SSG consist of wires made of only the shape-memory material or of individual lines of shape-memory material. The shape-memory material is for example Nitinol or other SMA alloy.

A further advantage can be achieved by connecting the wire ropes PSG and/or said one or more elastic and dissipative interconnection elements SSG to a source of electrical current in order to vary their thermal state by the Joule effect.

The hysteretic devices described above may be combined together. In fact, if a first DI-1 and a second DI-2 hysteretic device is provided, these can be stacked, wherein the third rigid element b1 of the first hysteretic device DI-1 is rigidly connected to the main frame F1 of the second hysteretic device DI-2, in such a way that the vertical direction of the first hysteretic device DI-1 is perpendicular to the vertical direction of the second hysteretic device DI-2.

The invention then also relates to a mechanical element or damped structure, comprising an element or mechanical structure PA, P, C, O and a vibration damper connected thereto, wherein the vibration damper is one of the hysteretic devices described above.

In the case of the embodiment with the third rigid element, the at least a frame F1 can be connected to or is part of said element or mechanical structure PA, the two rigid facing elements b2 and the third rigid element b1 being free to oscillate along said at least a guide G1, G2.

Or, said element or mechanical structure PA can be rigidly connected only to said third rigid element b1 of said vibrations damper DI, while said at least one frame F1 is rigidly connected to the source of motion from which the element or mechanical structure is to be isolated.

Still according to a variation, the element or mechanical structure PA is connected on one side to said at least one frame F1 and on another side to said third rigid element b1.

According to another variation, said at least a frame F1 is connected to a vehicle and said third rigid element b1 is connected to a bumper mechanical element H of said vehicle.

COMPARISON WITH THE PRIOR ART

Compared to WO2013042152 and WO9627055A1 documents, the present invention provides both a vertical and a horizontal shift, in every condition. In this way, the wire ropes are no longer in tension, and then the hysteresis diagram changes. In any case, the WO9627055A1 system is not equal to the present one, because the multi-slider system of WO9627055A1 provides a rotary coupling between the tensioned elements, and then, during the rotation, the perpendicularity between the translations is lost. This is reflected in a butterfly linear force-displacement diagram (see FIG. 13 of WO9627055A1), completely different from those obtained with the present invention.

FIELDS OF APPLICATION

The main applications of the rheological hysteretic device according to the invention are listed hereinafter:
Tuned mass damping devices;
Isolation devices;
Dissipators such as, for example, dissipative braces of facilities, infrastructure, frames, etc.;
Shock absorption devices;
Applications that use for their operation hysteretic non-linear restoring forces obtained with the presented device.

BIBLIOGRAPHY

[1] Stockbridge, G. H. (1928). Vibration Damper. U.S. Pat. No. 1,675,391.
[2] Michael, J. C. (1996), Wire rope isolator with crimp bar and method for making same, U.S. Pat. No. 5,549,285.
[3] Vestroni, F., Lacarbonara, W., Carpineto, N. (2012). Hysteretic tuned mass damper device (TMD) for passive control of mechanical vibrations. PCT/IT2012/00025, WO/2013/042152, International Patent, Sapienza University of Rome.
[4] Carboni, B., Lacarbonara, W. and Auricchio. F. (20014) Hysteresis of Multi-Configuration Assemblies of Nitinol and Steel Strands: Experiments and Phenomenological Identification. Journal of Engineering Mechanics, ASCE, 2014, DOI: 10.1061/(ASCE)EM.1943 7889.0000852.
[5] Carboni, B., Lacarbonara, W. A New Vibration Absorber based on the Hysteresis of Multi Configuration NiTiNOL Steel Wire Ropes Assemblies. Proceeding of the 2nd International Conference on Structural Nonlinear Dynamics and Diagnosis. Agadir (Morocco), 19-21 May 2014.
[6] Graesser, E. J. and Cozzarelli, F. A. (1999) Shape-Memory Alloys as new material for aseismic isolation.
[7] Wilde, K., Gardoni, P. and Fujino, Y. (2000) Base isolation system with shape memory alloy device for elevated highway bridges. Engineering Structures 22 222-229.
[8] Dolce, M., Cardone, D. and Mametto, R. (2000) Implementation and testing of passive control devices based on shape memory alloys. Earthquake Engineering Structural Dynamics 29:945-968.
[9] Van Zeggeren, W. A. (1991). Actuator with memory metal and a shock absorber provided with this actuator. U.S. Pat. No. 5,070,697. Washington, D.C.: U.S. Patent and Trademark Office.

In the foregoing preferred embodiments have been described as well variations of the present invention have been suggested, but it is to be understood that those skilled in the art may make modifications and changes, without so departing from the relevant scope of protection, as defined by the attached claims.

The invention claimed is:
1. A hysteretic device for passive control of the mechanical vibration due to translational motion, comprising:
at least one frame to which at least a rigid element is connected by a plurality of wire ropes, which are substantially straight in the unloaded condition, wherein:
the wire ropes are mutually parallel along a direction, that is termed horizontal direction, in the condition of absence of mechanical vibrations;
there are two facing rigid elements connected by wire ropes to opposite walls of said at least one frame;
said two facing rigid elements are movable along a vertical translational direction that is perpendicular to said horizontal direction;
the hysteretic device further comprising:
a third rigid element, which is positioned between said two facing rigid elements and connected to these by a movable connection system which allows only the reciprocal motion of the two facing rigid elements along the horizontal direction;
said third rigid element is mounted in a sliding manner along at least a guide which extends along said vertical direction and has two ends, which are secured to said at least one frame.

2. The hysteretic device according to claim 1, wherein said movable connection system comprises at least one straight bar, said two facing rigid elements being provided with means for the sliding of said at least one straight bar, in order to minimize the friction or to adjust it to a predetermined value.

3. The hysteretic device according to claim 1, wherein said movable connection system comprises one or more interconnection elastic and dissipative elements which interconnect said two rigid elements.

4. The hysteretic device according to claim 3, wherein said sliding mechanism is configured to provide a certain level of friction to sliding.

5. The hysteretic device according to claim 1, wherein said wire ropes and/or said further wire ropes comprises wires made only of shape memory material or by individual lines made of shape-memory material.

6. A hysteretic device, comprising:
   a first and a second hysteretic device, formed according to claim 1 and superimposed, wherein the third rigid element of the first hysteretic device is rigidly connected to the main frame of the second hysteretic device, in such a way that the vertical direction of the first hysteretic device is perpendicular to the vertical direction of the second hysteretic device.

7. The hysteretic device according to claim 6, wherein the hysteretic device is an element or mechanical structure with a vibration damper connected to it.

8. The hysteretic device according to claim 7, wherein only said at least one frame is connected to or is part of said element or mechanical structure, the two facing rigid elements and the third rigid element being free to oscillate along said at least one guide.

9. The hysteretic device according to claim 7, wherein said element or mechanical structure is rigidly connected only to said third rigid element of said vibrations damper, while said at least one frame is rigidly connected to the source of motion from which element or mechanical structure is to be isolated.

10. The hysteretic device according to claim 7, wherein said element or mechanical structure is connected on one side to said at least one frame and on another side to said third rigid element.

11. The hysteretic device according to claim 7, wherein said at least one frame is connected to a vehicle and said third rigid element is connected to a bumper mechanical element which is part of said vehicle.

12. A hysteretic device for passive control of the mechanical vibration due to translational motion, comprising:
   at least one frame to which at least a rigid element is connected by a plurality of wire ropes, which are substantially straight in the unload condition, wherein:
   the wire ropes are mutually parallel along a direction, termed horizontal direction, in the condition of absence of mechanical vibrations;
   there are two facing rigid elements connected by wire ropes to opposite walls of said at least one frame;
   said two facing rigid elements are movable along a vertical translational direction that is perpendicular to said horizontal direction;
   the hysteretic device further comprising:
   said two facing rigid elements are connected to said wire ropes by a sliding system configured to allow the relative motion between rigid element and respective wire rope along said horizontal direction;
   said two facing rigid elements are mounted in a sliding manner on at least one guide which extends along said vertical direction and has two ends, which are secured to said at least one frame.

13. The hysteretic device according to claim 12, wherein each of the two facing rigid elements is mounted on a respective guide.

14. A hysteretic device for the passive control of mechanical vibrations due to translational motion, comprising:
   at least one frame to which a rigid element is connected by a plurality of wire ropes, which are substantially straight in an unload condition, wherein:
   the wire ropes are mutually parallel along a direction, termed horizontal direction, in the condition of absence of mechanical vibrations;
   said rigid element is movable along a vertical translational direction that is perpendicular to said horizontal direction;
   the hysteretic device further comprising:
   said rigid element is connected to said wire ropes by a sliding system configured to allow the relative motion between rigid element and respective wire rope along said horizontal direction;
   said rigid element is mounted in a sliding manner on at least one guide which extends along said vertical direction and has two ends, which are secured to said at least one frame.

15. A tuned-mass hysteretic device for passive control of the mechanical vibrations due to translational motion, comprising:
   at least one frame to which at least one tuned mass is connected by connection means, wherein:
   said connection means comprise a plurality of wire ropes, which are substantially straight in the unloaded condition;
   said at least one tuned mass is movable along at least one translation direction;
   the wire ropes are connected at one end directly to said frame and the other end directly to said at least one tuned mass, so that they are substantially perpendicular to said at least one translation direction under conditions of no load;
   wherein:
   said at least one tuned mass is a spherical mass resting on said frame;
   said spherical mass is connected, by a plurality of wire ropes aligned in the direction of the force of gravity, arranged with radial symmetry with respect to the spherical mass, to the frame;
   the connection between each wire rope and said at least one mass is constituted by a sliding system configured to allow the relative motion between said at least one tuned mass and the wire rope along said direction of the force of gravity.

16. The hysteretic device according to claim 15, further comprising interconnection elastic and dissipative elements are able to provide in said horizontal direction a elastoplastic or perfect-plastic dissipative behavior.

17. The hysteretic device according to claim 16, wherein said one or more interconnection elastic and dissipative elements comprise wire ropes.

18. The hysteretic device according to claim 17, wherein said wire ropes and/or said further wire ropes are made of steel.

19. The hysteretic device according to claim 17, wherein said wire ropes and/or said further wire ropes comprise a plurality of steel wires and a plurality of wires made of shape-memory material.

20. The hysteretic device according to claim 19, wherein the shape-memory material is Nitinol or another SMA alloy.

21. The hysteretic device according to claim 17, wherein said wire ropes and/or said one or more interconnection elastic and dissipative elements are connected to a source of electrical current in order to vary their thermal state by the Joule effect.

* * * * *